(12) United States Patent
Wei et al.

(10) Patent No.: US 8,484,748 B2
(45) Date of Patent: Jul. 9, 2013

(54) METHOD AND DEVICE FOR CLASSIFYING AND PROCESSING DATA IN INSTANT MESSAGING SYSTEM

(75) Inventors: Ran Wei, Shenzhen (CN); Jie Yang, Shenzhen (CN)

(73) Assignee: Tencent Tecnology (Shenzhen) Company Limited, Shenzhen (CN)

( * ) Notice: Subject to any disclaimer, the term of this patent is extended or adjusted under 35 U.S.C. 154(b) by 312 days.

(21) Appl. No.: 12/637,253

(22) Filed: Dec. 14, 2009

(65) Prior Publication Data

US 2010/0095385 A1    Apr. 15, 2010

Related U.S. Application Data

(63) Continuation of application No. PCT/CN2008/070915, filed on May 8, 2008.

(30) Foreign Application Priority Data

Jun. 14, 2007 (CN) .......................... 2007 1 0111301

(51) Int. Cl.
    *H04L 29/06*    (2006.01)
(52) U.S. Cl.
    USPC ................ 726/28; 726/27; 726/30; 713/182; 713/183; 707/783; 707/784; 707/787
(58) Field of Classification Search
    None
    See application file for complete search history.

(56) References Cited

U.S. PATENT DOCUMENTS

| | | | |
|---|---|---|---|
| 7,502,831 B1 * | 3/2009 | Macias et al. ................ | 709/206 |
| 7,552,467 B2 * | 6/2009 | Lindsay ............................ | 726/5 |
| 7,583,793 B2 * | 9/2009 | Jacovi et al. ............... | 379/88.17 |
| 7,600,258 B2 * | 10/2009 | Desouza et al. ................ | 726/24 |
| 7,895,330 B2 * | 2/2011 | Evanchik et al. ............. | 709/226 |
| 7,933,205 B1 * | 4/2011 | Shaw et al. .................... | 370/235 |
| 7,970,847 B1 * | 6/2011 | Runstedler et al. ........... | 709/206 |
| 8,112,483 B1 * | 2/2012 | Emigh et al. .................. | 709/206 |
| 8,280,922 B2 * | 10/2012 | Rakesh et al. ................ | 707/805 |

(Continued)

FOREIGN PATENT DOCUMENTS

| | | |
|---|---|---|
| CN | 1767432 A | 5/2006 |
| CN | 101051293 A | 10/2007 |
| CN | 101072206 A | 11/2007 |
| WO | 03/034193 A2 | 4/2003 |

OTHER PUBLICATIONS

International Search Report for International Patent Application No. PCT/CN2008/070915, dated Aug. 21, 2008, and English translation thereof.

(Continued)

*Primary Examiner* — Nathan Flynn
*Assistant Examiner* — Michael R Vaughan

(57) ABSTRACT

The embodiment of this invention provides a method for classifying and processing data in an instant messaging system, which includes: classifying the data of every service included in the instant messaging system into confidential data and non-confidential data; obtaining and processing the non-confidential data of every service after a first authentication is passed successfully; and obtaining and processing the confidential data of every service after a second authentication is passed successfully. The embodiment of this invention also provides a device for classifying and processing data in an instant messaging system. According to the embodiment of the present invention, the security requirements of the instant messaging system are met, and the user is facilitated to use various services provided by the instant messaging system.

20 Claims, 6 Drawing Sheets

U.S. PATENT DOCUMENTS

| | | |
|---|---|---|
| 8,345,601 B2 * | 1/2013 | Lazaridis et al. ............. 370/328 |
| 2003/0097583 A1 | 5/2003 | Lacan et al. |
| 2004/0019695 A1 * | 1/2004 | Fellenstein et al. ........... 709/239 |
| 2005/0075880 A1 * | 4/2005 | Pickover et al. .............. 704/270 |
| 2006/0018447 A1 * | 1/2006 | Jacovi et al. ............... 379/88.17 |
| 2010/0023892 A1 * | 1/2010 | Rakesh et al. ................. 715/835 |
| 2011/0061109 A1 * | 3/2011 | Austin et al. ................... 726/27 |
| 2012/0017268 A9 * | 1/2012 | Dispensa ......................... 726/7 |

OTHER PUBLICATIONS

Chinese Office Action for Chinese Patent Application No. 2007101113011, dated Aug. 14, 2009, and English translation thereof.

\* cited by examiner

METHOD AND DEVICE FOR CLASSIFYING AND PROCESSING DATA IN INSTANT MESSAGING SYSTEM

CROSS-REFERENCE TO RELATED APPLICATIONS

This application is a continuation of International Application No. PCT/CN2008/070915, filed May 8, 2008. This application claims the benefit and priority of Chinese Patent Application No. 200710111301.1, filed Jun. 14, 2007. The entire disclosures of each of the above applications are incorporated herein by reference.

FIELD

The present disclosure relates to the field of instant messaging, and in particular to a method and device for classifying and processing data in an instant messaging system.

BACKGROUND

This section provides background information related to the present disclosure which is not necessarily prior art.

As a commonly-used network communication tool, the instant messaging system provides more and more functions. Typically, it is required to perform a first authentication when logging in the instant messaging system. After passing the first authentication, the user may use the instant messaging service included in the instant messaging system. Through the instant messaging system, another service, such as email, personal webpage, network hard disk and the like, may be linked as required. In order to facilitate operation, the display panel of the instant messaging system is configured with the link identifier of a relevant service, by clicking which the page of the relevant service may be linked. However, the service with more security requirements needs to perform a second authentication for the user when it is started.

Thus, when the non-instant messaging service included in the instant messaging system is used, it is required to perform the second authentication for the non-instant messaging service. In the instant messaging system of the prior art, the second authentication is configured according to the type of service, and the second authentication needs to be performed when it is required to access any data of the non-instant messaging service. Although to perform the second authentication for every data of the non-instant messaging service may help in increasing the security of the corresponding service of the instant messaging system, the user has to remember respective passwords corresponding to various services, thus the user cannot use the non-instant messaging service included in the instant messaging system easily.

SUMMARY

This section provides a general summary of the disclosure, and is not a comprehensive disclosure of its full scope or all of its features.

The embodiment of the present invention provides a method for classifying and processing data in an instant messaging system, which includes: classifying the data of every service included in the instant messaging system into confidential data and non-confidential data; obtaining and processing the non-confidential data of every service after a first authentication is passed successfully; and obtaining and processing the confidential data of every service after a second authentication is passed successfully.

An embodiment of the present invention provides a device for classifying and processing data in an instant messaging system, which includes: a data classifying unit, adapted to classify the data of every service included in the instant messaging system into confidential data and non-confidential data; a non-confidential data obtaining unit, adapted to obtain, when the service is activated, the non-confidential data of every service after a first authentication is passed successfully; a second authentication unit, adapted to implement a second authentication of the instant messaging system, and to send confirmation information used for indicating that the second authentication is passed successfully after the second authentication is passed successfully; and a confidential data obtaining unit, adapted to obtain the confidential data of the service after receiving the confirmation information used for indicating that the second authentication is passed successfully sent from the second authentication unit.

According to the method and device for classifying and processing data in an instant messaging system provided by the embodiment of the present invention, the data of every service provided by the instant messaging system is classified into confidential data and non-confidential data, the non-confidential data is obtained and processed after a first authentication is passed successfully, and the confidential data is obtained and processed after a second authentication is passed successfully. According to the embodiment of the present invention, once a certain service is activated in the instant messaging system, the user can thus perform a non-confidential data related operation of the service, hence facilitating the user. If the user wishes to operate the confidential data, the second authentication is required to be performed, so as to ensure the security of the data of the service that needs to be confidential. Being compared with the prior art where it is required to perform the second authentication for all operations of every non-instant messaging service included in the instant messaging system, the method and device according to the embodiment of the present invention not only meet the security requirements of the instant messaging system, but also facilitate the user to use various services of the instant messaging system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

For better understanding of the objects, features and advantages of the present invention, the present invention is described in detail hereinbelow with reference to the accompanying drawings and the embodiments.

Figure 1:
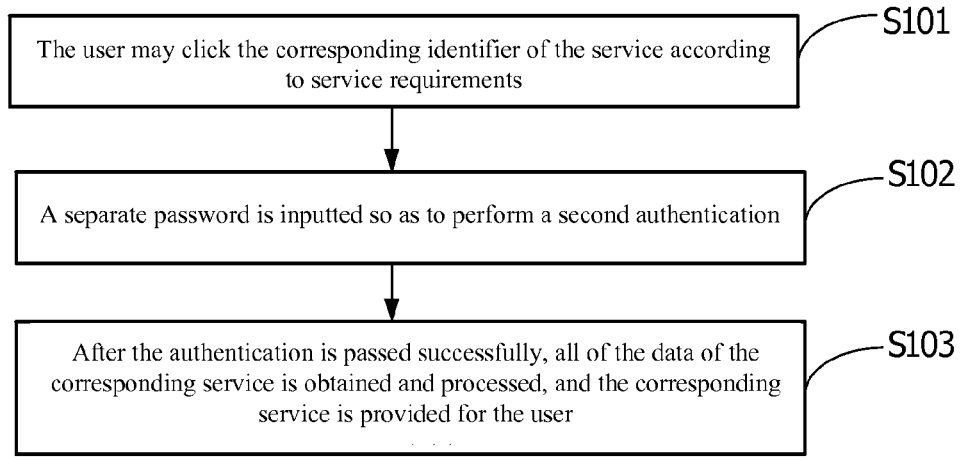
FIG. 1 is a flowchart illustrating a method for service classification and processing in an instant messaging system of the prior art.

FIG. 1 is a flowchart illustrating a method for service classification and processing in an instant messaging system of the prior art. The method includes steps as follows.

Step S101: After being started normally based on a first authentication, the instant messaging system provides an instant messaging service normally, with the identifier of a non-instant messaging service being displayed on the display panel of the instant messaging system, where the user may click the corresponding identifier of the service according to service requirements. The non-instant messaging service includes: email, personal webpage, network hard disk, etc.

After the identifier of the service is activated, the page of the service is linked.

For example, if the user clicks the identifier of email in the instant messaging system, the page of the email of the user is linked.

Step S102: A separate password is inputted so as to perform a second authentication.

The instant messaging system pops up a dialog box to ask the user to input the separate password which is different from the instant messaging password, so as to perform the second authentication for the user's identity.

For example, the user inputs the password corresponding to the email system into the dialog box to perform the second authentication.

Step S103: After the authentication is passed successfully, all of the data of the corresponding service is obtained and processed, and the corresponding service is provided for the user.

The instant messaging system authenticates the separate password inputted by the user. If it is identical to the preset separate password, the authentication is passed successfully, and the data of the corresponding service is obtained and processed and the corresponding service is provided for the user. If it is different from the preset separate password, error information is returned.

It can be understood from the above steps that in prior art, depending on various service types provided by the instant messaging system, the data of the instant messaging system is processed after the second authentication is passed successfully. Thus in the prior art, the second authentication is performed for every data of the non-instant messaging service. Although this may help in increasing the security of the corresponding service of the instant messaging system, the user has to remember respective passwords corresponding to various services, thus the user cannot use the non-instant messaging service included in the instant messaging system easily.

According to the embodiment of the present invention, the data of all the services provided by the instant messaging system is processed according to whether the data needs to be confidential, instead of processing the data according to the type of the service. The data of every service that does not need to be confidential is provided for the user after the first authentication is passed successfully. The second authentication is performed only when the user needs to access the confidential data of those services, thus facilitating the user to use the service of the instant messaging system and ensuring the security of the instant messaging system.

Figure 2:
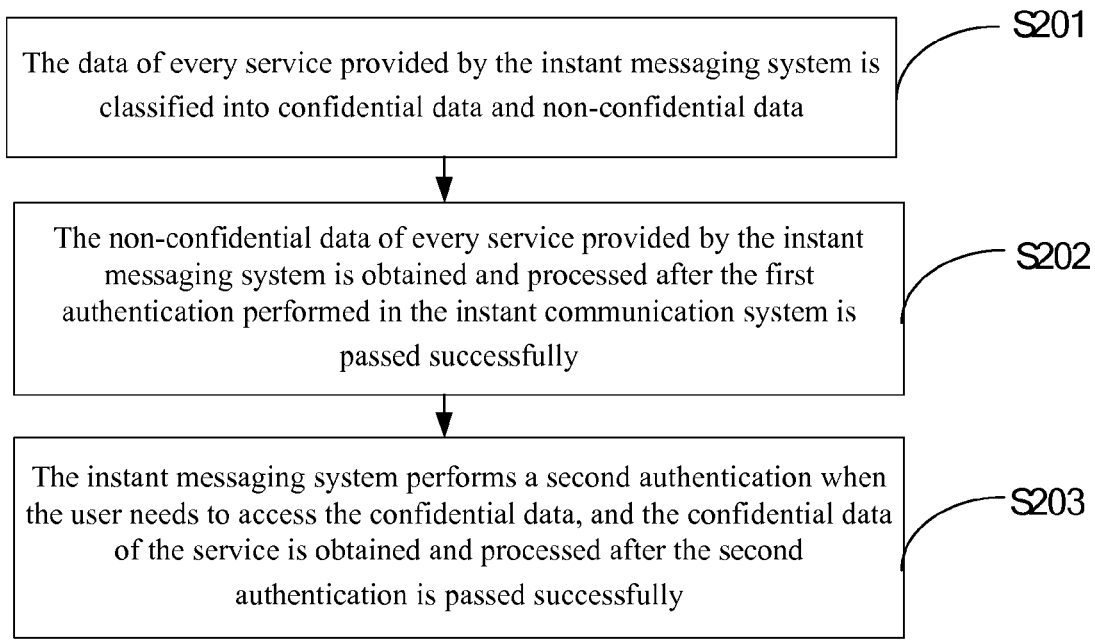
FIG. 2 is a flowchart illustrating a method for classifying and processing data in an instant messaging system according to a first embodiment of the present invention.

FIG. 2 is a flowchart illustrating a method for classifying and processing data in an instant messaging system according to a first embodiment of the present invention. The method includes steps as follows.

Step S201: The data of every service provided by the instant messaging system is classified into confidential data and non-confidential data. The classified data may be included with a confidential-or-not flag used for indicating whether the data can be displayed so as to be processed by the user after the first authentication is passed successfully.

The services provided by the instant messaging system include: the instant messaging service provided by the instant messaging system itself, a plurality of non-instant messaging services connected with and provided by the instant messaging system. The non-instant messaging service includes: email, network hard disk, personal webpage, etc. Specifically, the process of classifying the data of every service provided by the instant messaging system includes: classifying the data of the instant messaging service and the non-instant messaging service provided by the instant messaging system into confidential data and non-confidential data. Specifically, the email service involves data of new mail, data of received mail, data in draft box, other relevant data, etc. The network hard disk service includes resource data of TV drama program, resource data of movie, resource data of song, etc. The personal webpage service includes data of diary, data of photo, etc. Thus, the data of every service provided by the instant messaging system is classified into confidential data and non-confidential data according to the property of the service and the importance of the service data, and is identified by a confidential-or-not flag.

Step S202: The non-confidential data of every service provided by the instant messaging system is obtained and processed after the first authentication performed in the instant messaging system is passed successfully.

The display panel of the instant messaging system is configured with the identifier of various services, where the user may call a certain service by clicking the identifier of the service. The instant messaging system performs determination for each data of the service according to the confidential-or-not flag of the data of the service. If being determined as non-confidential data, the data is obtained and processed. If being determined as confidential data, the data is not obtained and processed.

Step S203: The instant messaging system performs a second authentication when the user needs to access the confidential data, and the confidential data of the service is obtained and processed after the second authentication is passed successfully.

When it is required to perform a relevant operation for the confidential data, the separate password corresponding to the service is obtained, and is compared with the preset separate password. If they are identical to each other, the second authentication is passed successfully and the confidential data of the service is obtained. If they are different from each other, prompt information used for indicating that the password is wrong is returned.

Therefore, the non-confidential data of every service of the instant messaging system is displayed for the user to perform processing after the first authentication is passed successfully. It is required to perform the second authentication only when the user needs to operate the confidential data of the service, and after the second authentication is passed successfully, the confidential data is displayed for the user to perform processing, thus ensuring the security requirements of the instant messaging system and facilitating the user to use the service of the instant messaging system easily and quickly.

In a second embodiment of the present invention, the email system linked by the instant messaging system is taken as an example to describe the data processing procedure in the case that the instant messaging system provides an email service. In the email service, the mail data newly received or having not been accessed typically needs to be processed by the user in time, contains a relatively small amount of data, and thus is not confidential. The data stored in the inbox or the draft box of the email system that has been accessed is the historical data stored by the user, which contains more information and typically is confidential. Thus, for the email system, the data can be classified into confidential data and non-confidential data according to whether the data has been accessed.

Figure 3:
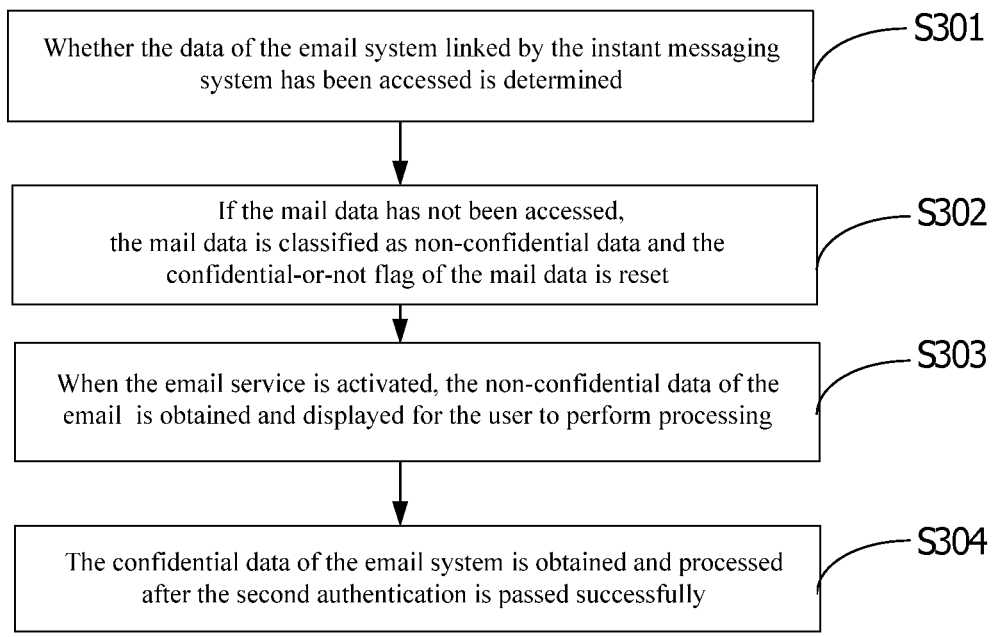
FIG. 3 is a flowchart illustrating the method for classifying and processing data in an instant messaging system according to a second embodiment of the present invention.

FIG. 3 is a flowchart illustrating the method for classifying and processing data in an instant messaging system according to a second embodiment of the present invention. The method includes steps as follows.

Step S301: Whether the data of the email system linked by the instant messaging system has been accessed is determined.

The data of the email system linked by the instant messaging system includes: data in inbox, data in outbox, data in draft box, other relevant data, etc. The inbox receives new mail. If the data of the received mail has been accessed, the accessed-or-not flag corresponding to the data is set. The instant messaging system determines whether the mail data has been accessed according to the accessed-or-not flag.

Step S302: If the mail data has not been accessed, the mail data is classified as non-confidential data and the confidential-or-not flag of the mail data is reset; otherwise, the mail data is classified as confidential data and the confidential-or-not flag of the mail data is set.

For example, if the data of the newly received mail has not been accessed, the accessed-or-not flag corresponding to the mail data is reset, the mail data is classified as non-confidential data, and the confidential-or-not flag of the mail data is reset. If the data of the received mail has been accessed, the accessed-or-not flag corresponding to the mail data is set, the mail data is classified as confidential data, and the confidential-or-not flag of the mail data is set.

Step S303: When the email service is activated, the non-confidential data of email is obtained and displayed for the user to perform processing.

The email identifier configured on the display panel of the instant messaging system is clicked, and the email system is activated. The instant messaging system performs determination for each data of the email system according to the confidential-or-not flag of the data. The data is obtained and processed if it is non-confidential data. The data is not obtained and processed if it is confidential data.

The instant messaging system may choose to display the email system linked therewith in a completely displaying mode or an incompletely displaying mode. If the completely displaying mode is chosen, the identifier corresponding to the confidential data and the non-confidential data of the email system, as well as various application function identifiers, are obtained, and complete interface information of the email system is displayed, but the user cannot operate the identifier related to the confidential data before passing the second authentication. For example, in the case of the completely displaying mode, an inbox identifier, an outbox identifier, a draft box identifier, and a mail writing operation identifier and the like are displayed on the interface of the email system.

If the incompletely displaying mode is chosen, only the identifier corresponding to the non-confidential data of the email system, as well as various application function identifiers, are obtained, and incomplete interface information of the email system is displayed. For example, in the case of the incompletely displaying mode, only an unread mail identifier and a mail writing operation identifier and the like are displayed on the interface of the email system.

Step S304: The confidential data of the email system is obtained and processed after the second authentication is passed successfully.

If it is required to perform a relevant operation for the confidential data of the email system, the separate password corresponding to the email system is obtained, and is compared with the preset separate password. If they are identical to each other, the second authentication is passed successfully, and the confidential data of the email system is obtained and processed. Otherwise, prompt information used for indicating that the password is wrong is returned.

In the case that the user chooses the completely displaying mode, after the second authentication is passed successfully, the identifier related to the confidential data can be operated. In the case that the user chooses the completely displaying mode, after the second authentication is passed successfully, the identifier corresponding to the confidential data is obtained and the complete mode of the email system is displayed.

In the second embodiment of the present invention, the data is classified into confidential data and non-confidential data according to the accessed-or-not flag, and the data of the email system is configured with the confidential-or-not flag correspondingly. In the email system linked by the instant messaging system, new mail data that has not been read and is not confidential can be effectively classified as non-confidential data, the user can switch to the email system through the instant messaging system to operate the new mail, thus facilitating the user. The stored mail data that has been read and is confidential can be classified as confidential data, and the confidential data can only be operated after the second identity authentication is performed for the user, thus ensuring the security of the relevant data of the email system.

In a third embodiment of the present invention, the network hard disk service linked by the instant messaging system is taken as an example to describe the data processing process that the instant messaging system provides a network hard disk service. The network hard disk service can be used to store various data, e.g. to store resource data of TV drama program, resource data of music and song, resource data of movie, etc. Because the resource of newly launched TV drama program, song, movie and the like attracts a large number of users, the visiting frequency thereof is quite high. Thus the resource data having a high visiting frequency can be set as confidential data, and the second authentication and the corresponding management is performed for the user intended to download such resource data. On the contrary, the resource of outdated TV drama program, song, movie and the like attracts fewer users, the downloading frequency is thus lower, and therefore such resource data can be set as non-confidential data and is provided for the user freely.

Figure 4:
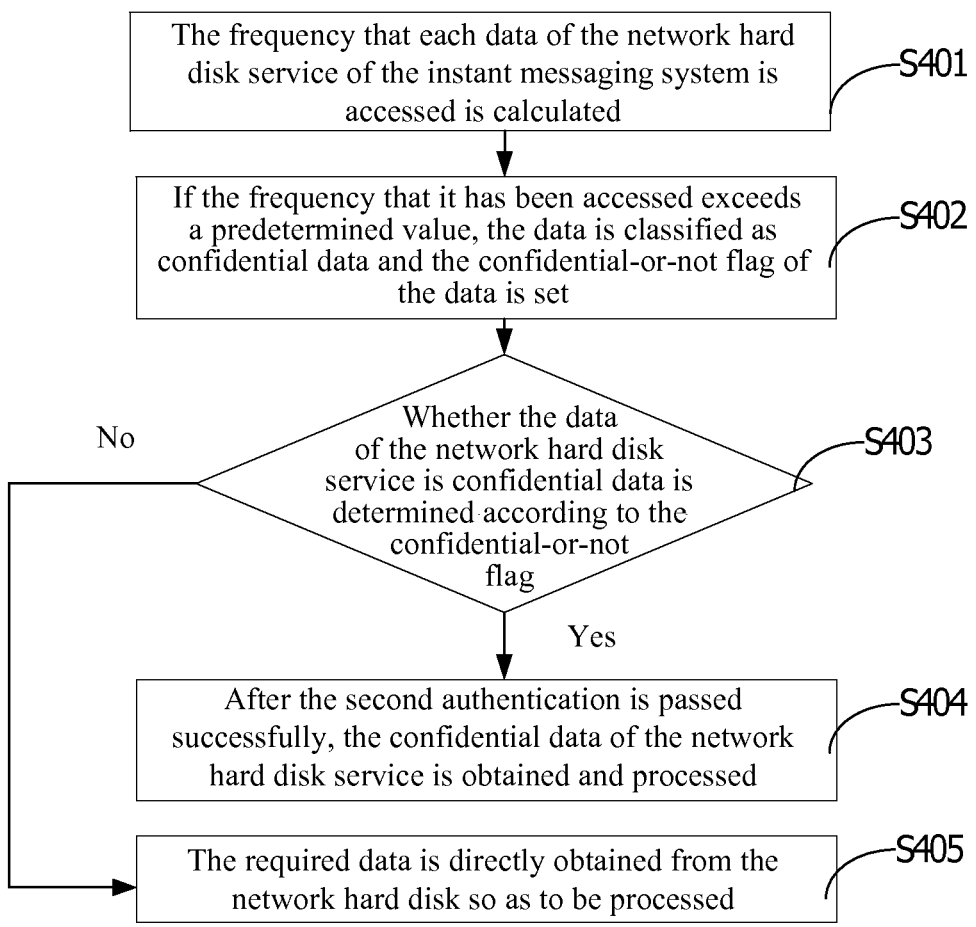
FIG. 4 is a flowchart illustrating the method for classifying and processing data in an instant messaging system according to a third embodiment of the present invention.

FIG. 4 is a flowchart illustrating the method for classifying and processing data in an instant messaging system according to a third embodiment of the present invention. The method includes steps as follows.

Step S401: The frequency that each data of the network hard disk service of the instant messaging system is accessed is calculated.

To calculate the frequency that each data of the network hard disk service of the instant messaging system is accessed includes, for example, the frequency that each TV drama program is accessed, the frequency that each song is accessed, the frequency that each movie is accessed, etc.

Step S402: If the frequency that it has been accessed exceeds a predetermined value, the data is classified as confidential data and the confidential-or-not flag of the data is set; otherwise, the data is classified as non-confidential data and the confidential-or-not flag of the data is reset.

The frequency that each data in the network hard disk is accessed is compared with the predetermined value. If the frequency that it has been accessed exceeds the predetermined value, the data is classified as confidential data and the confidential-or-not flag of the data is set. If the frequency that it has been accessed is lower than the predetermined value, the data is classified as non-confidential data and the confidential-or-not flag of the data is reset. Specifically, the predetermined value may be 50 million times/day.

Step S403: When the network hard disk service is activated, whether the data of the network hard disk service is confidential data is determined according to the confidential-or-not flag, go to Step S404 if it is confidential data, and go to Step S405 otherwise.

For example, when wishing to download a newly launched movie, the user clicks the identifier of the movie, the system determines whether the data of the movie is confidential data, go to Step S404 if the data of the movie is confidential data, and go to Step S405 otherwise.

Step S404: After the second authentication is passed successfully, the confidential data of the network hard disk service is obtained and processed.

The separate password corresponding to the network hard disk is obtained, and is compared with the preset separate password. If they are identical to each other, the second authentication is passed successfully and the data of the movie that the user requires is obtained and processed. Otherwise, prompt information used for indicating that the password is wrong is returned.

Step S405: The required data is directly obtained from the network hard disk so as to be processed.

After the data of the movie that the user requires is determined as non-confidential data, the instant messaging system obtains the data of the movie that the user requires directly from the network hard disk service.

In the third embodiment of the present invention, by calculating the frequency that the data of the network hard disk service has been accessed, the instant messaging system effectively classifies the data in the network hard disk into confidential data and non-confidential data. The data of the network hard disk service that has been accessed in a low frequency is classified as non-confidential data, and is completely open to all users, thus facilitating the user to download the data at any time. The data of network hard disk service that is new and has been accessed in a high frequency is classified as confidential data, and it is required to perform the second authentication for the user intended to download it, thus facilitating effectively managing the user downloading the confidential data. When the data of the network hard disk service is outdated, the frequency that it is accessed decreases, its utilization value also decreases, and there is no need to keep the data as confidential anymore, thus the instant messaging system classifies it as non-confidential data.

In a fourth embodiment of the present invention, the personal webpage linked by the instant messaging system is taken as an example to describe the data processing process that the instant messaging system provides a personal webpage service. If the user uses the personal webpage linked by the instant messaging system to record personal information (such as personal diary, personal photo), the information newly added by the user typically is not confidential and can be open to another user. However, the stored historical record typically is confidential and it is required to perform an identity authentication for another accessing user. Thus, in the personal webpage, the data can be classified into confidential data and non-confidential data according to the time that it is generated, and the data of the personal webpage service is configured with the confidential-or-not flag correspondingly.

Figure 5:
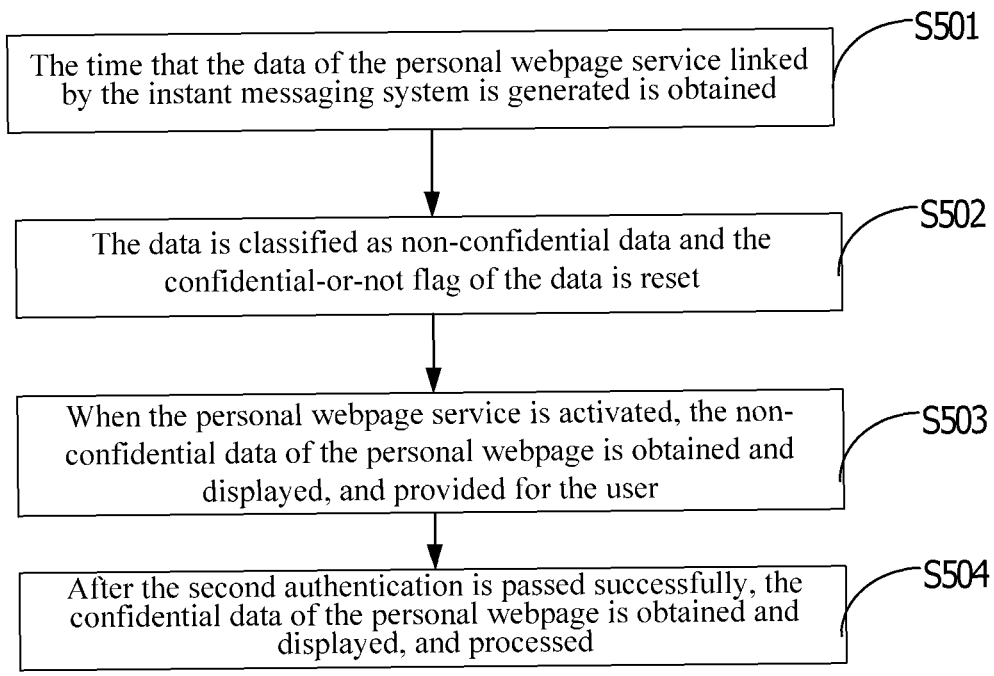
FIG. 5 is a flowchart illustrating the method for classifying and processing data in an instant messaging system according to a fourth embodiment of the present invention.

FIG. 5 is a flowchart illustrating the method for classifying and processing data in an instant messaging system according to a fourth embodiment of the present invention. The method includes steps as follows.

Step S501: The time that the data of the personal webpage service linked by the instant messaging system is generated is obtained.

The time that the data of the personal webpage service is generated refers to the time that the data of the personal webpage service is stored into the personal webpage. For example, the time that the newly written diary is stored is May 12th, and the time that the other diary already contained in the database is stored is earlier than May 1st.

Step S502: If the time that the data is generated is later than a predetermined time, the data is classified as non-confidential data and the confidential-or-not flag of the data is reset; otherwise, the data is classified as confidential data and the confidential-or-not flag is set.

A reference time is set and the time that the data of the personal webpage service is generated is compared with the reference time having been set. If the time that it is generated is earlier than the time having been set, the data is classified as confidential data. If the time that it is generated is later than the time having been set, the data is classified as non-confidential data.

For example, the reference time having been set is the eighth day prior to the current time, where the current time is May 15th, thus the time having been set is May 7th. The time that the new diary is written is May 12th, which is later than the time having been set, thus the data of the diary is non-confidential data. The time that any of the diary stored in the database is generated is earlier than May 1st, hence is earlier than the time having been set, thus the data of the stored diary is confidential data.

Step S503: When the personal webpage service is activated, the non-confidential data of the personal webpage is obtained and displayed, and provided for the user.

The personal webpage identifier on the display panel of the instant messaging system is clicked, and the personal webpage service is activated. The instant messaging system determines whether the data of the personal webpage service is non-confidential data according to the confidential-or-not flag. If so, the data is obtained and processed. Otherwise, the data is not obtained and processed.

The personal webpage service may choose to use a completely displaying mode and an incompletely displaying mode. When the completely displaying mode is chosen, the confidential data and the non-confidential data of the personal webpage service are obtained and displayed, where the personal webpage displays complete interface information. For example, the identifier of newly stored diary and the identifier of previously stored diary are displayed on the interface of the personal webpage, but other user(s) cannot perform the relevant operation for the identifier related to the confidential data.

When the incompletely displaying mode is chosen, the non-confidential data of the personal webpage is obtained and displayed, where incomplete interface information of the personal webpage is displayed. For example, only the identifier of newly stored diary is displayed on the interface of the personal webpage.

Step S504: After the second authentication is passed successfully, the confidential data of the personal webpage is obtained and displayed, and processed.

When it is required to perform a relevant operation for the confidential data, the separate password corresponding to the personal webpage is obtained, and is compared with the preset separate password. If they are identical to each other, the second authentication is passed successfully and the confidential data of the personal webpage service is obtained. Otherwise, prompt information used for indicating that the password is wrong is returned.

In the case that the user chooses the completely displaying mode, after the second authentication is passed successfully, the identifier related to the confidential data can be processed. In the case that the user chooses the completely displaying mode, after the second authentication is passed successfully, the confidential data is obtained and processed and the complete mode of the personal webpage is displayed.

In the fourth embodiment of the present invention, the data of the personal webpage service is classified into confidential data and non-confidential data according to the time that it is generated. Specifically, the newly stored diary or the newly uploaded photo is determined as unimportant data, and there is no need to perform the second authentication when another user accesses the data, thus facilitating the user to read the personal webpage. It is required to perform the second authentication only when the user accesses the previously stored diary or photo of the personal webpage, thus ensuring the security of the data of the personal webpage service.

Based on the above method for performing the second authentication in the instant messaging system, an embodiment of the present invention provides a system for performing the second authentication in the instant messaging system. The system can meet the security requirements of the instant messaging system, and can also facilitate the user to use various services of the instant messaging system easily and quickly.

Figure 6:
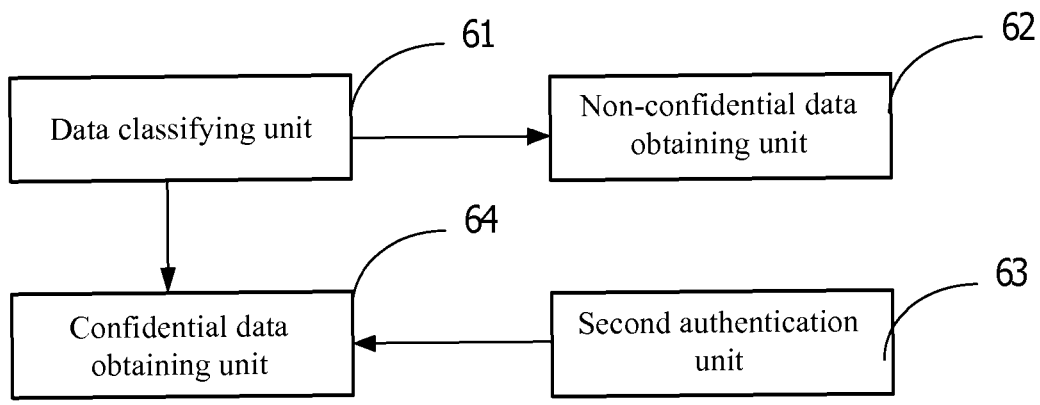
FIG. 6 is a schematic diagram illustrating the instant messaging system that implements data classification and processing according to a fifth embodiment of the present invention.

FIG. 6 is a schematic diagram illustrating the instant messaging system that implements data classification and processing according to a fifth embodiment of the present invention. The instant messaging system that implements data classification and processing includes: a data classifying unit 61, a non-confidential data obtaining unit 62, a second authentication unit 63, and a confidential data obtaining unit 64.

Specifically, the data classifying unit 61 is adapted to classify the data of every service of the instant messaging system into confidential data and non-confidential data, and to configure a confidential-or-not flag for the confidential data and the non-confidential data respectively.

The non-confidential data obtaining unit 62 is adapted to obtain the non-confidential data of the service of the instant messaging system when the service is activated. The non-confidential data obtaining unit 62 is adapted to determine whether each data of the service is non-confidential data by performing determination for the confidential-or-not flag of the data. If so, the data is obtained. Otherwise, the data is not obtained.

The second authentication unit 63 is adapted to perform a second authentication for the user's identity, and to send confirmation information used for indicating that the second authentication is passed successfully to the confidential data obtaining unit 64 after the second authentication is passed successfully. When a relevant operation needs to be performed for the confidential data, the second authentication unit 63 is adapted to obtain the separate password corresponding to the service of the confidential data, and to compare it with the preset separate password, to send the confirmation information used for indicating that the second authentication is passed successfully to the confidential data obtaining unit 64 if the passwords are identical to each other, and to return prompt information used for indicating that the password is wrong otherwise.

The confidential data obtaining unit 64 is adapted to obtain the confidential data of the service of the instant messaging system when it is required to use the confidential data of the service. The confidential data obtaining unit 64 determines whether the data of the service is confidential data according to the confidential-or-not flag of the data, and to obtain the confidential data if so.

In the case that the user uses the email service linked by the instant messaging system, according to a sixth embodiment of the present invention, a determining unit is added to determine whether the mail data of the email system has been accessed. The data is classified as confidential data if it has been accessed, and the confidential-or-not flag of the data is set. The data is classified as non-confidential data if it has not been accessed, and the confidential-or-not flag is reset.

Figure 7:
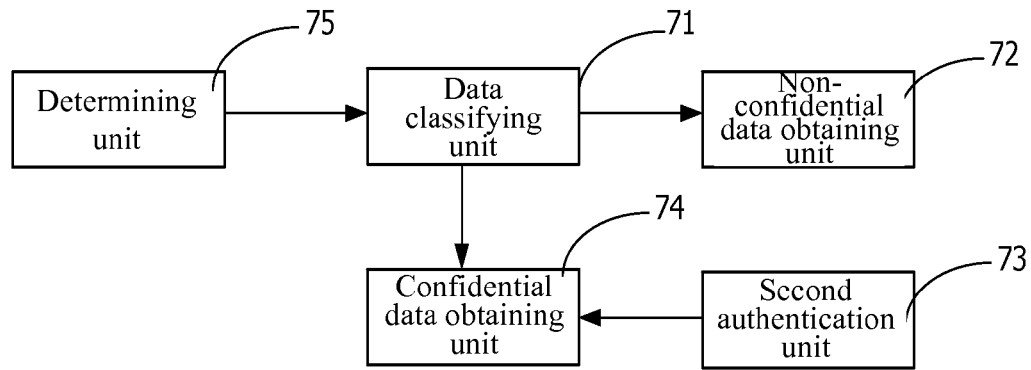
FIG. 7 is a schematic diagram illustrating the instant messaging system that implements data classification and processing according to a sixth embodiment of the present invention.

FIG. 7 is a schematic diagram illustrating the instant messaging system that implements data classification and processing according to a sixth embodiment of the present invention. The instant messaging system that implements data classification and processing data includes: a data classifying unit 71, a non-confidential data obtaining unit 72, a second authentication unit 73, a confidential data obtaining unit 74, and a determining unit 75.

Specifically, the determining unit 75 is adapted to determine whether the data of the service of the instant messaging system has been accessed, and to send a result of the determination to the data classifying unit 71.

The data classifying unit 71 is adapted to classify the data that has been accessed as confidential data according to the result of the determination and to set the confidential-or-not flag of the data, and to classify the data that has not been accessed as non-confidential data according to the result of the determination and to reset the confidential-or-not flag of the data.

The functions of the other units of the sixth embodiment of the present invention are identical to those of the corresponding units of the fifth embodiment of the present invention, thus are not described repeatedly herein.

The network hard disk service of the instant messaging system may be used to store various data. According to a seventh embodiment of the present invention, a times-accessed calculating unit may be added to calculate the number of times that the data stored in the network hard disk service has been accessed. Further, the data classifying unit is used to compare the calculated number of times with a reference value, to classify the data as confidential data if the number of times that it has been accessed exceeds the reference value, and to classify the data as non-confidential data if the number of times that it has been accessed is smaller than the reference value, with the confidential data and the non-confidential data being configured with a confidential-or-not identifier respectively.

Figure 8:
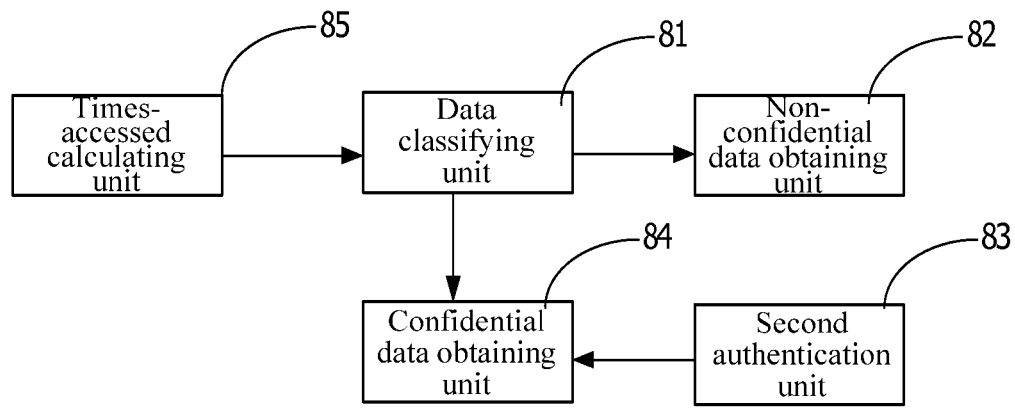
FIG. 8 is a schematic diagram illustrating the instant messaging system that implements data classification and processing according to a seventh embodiment of the present invention.

FIG. 8 is a schematic diagram illustrating the instant messaging system that implements data classification and processing according to a seventh embodiment of the present invention. The instant messaging system that implements data classification and processing includes: a data classifying unit 81, a non-confidential data obtaining unit 82, a second authentication unit 83, a confidential data obtaining unit 84, and a times-having-been-accessed calculating unit 85.

Specifically, the times-having-been-accessed calculating unit 85 is adapted to calculate the number of times that each data of the service of the instant messaging system has been accessed, and to send a result of the calculation to the data classifying unit 81.

The data classifying unit 81 is adapted to compare the result of the calculation with a reference value, to classify the data as confidential data if the number of times that it has been accessed exceeds the reference value, and to classify the data as non-confidential data if the number of times that it has been accessed is smaller than the reference value, with the confidential data and the non-confidential data being configured with a confidential-or-not identifier respectively. In the embodiment, the reference value is 50 million times/day.

The functions of the other units of the seventh embodiment of the present invention are identical to those of the corresponding units of the fifth embodiment of the present invention, thus are not described repeatedly herein.

The personal webpage service of the instant messaging system may be used to record personal information, e.g. personal diary, personal photo, etc. According to an eighth embodiment of the present invention, a data generation time obtaining unit is added to obtain the time that each data of the personal webpage service is generated. Further, the data classifying unit is adapted to compare the obtained time that the data is generated with a predetermined reference time, to classify the data as confidential data if the time that it is generated is earlier than the reference time, and to classify the data as non-confidential data if the time that it is generated is later than the reference time, with the confidential data and the non-confidential data being configured with a confidential-or-not identifier respectively.

Figure 9:
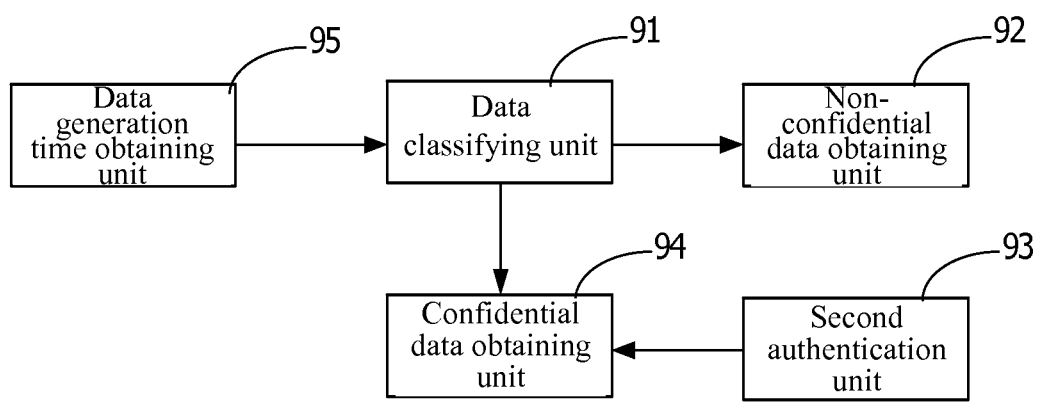
FIG. 9 is a schematic diagram illustrating the instant messaging system that implements data classification and processing according to an eighth embodiment of the present invention.

FIG. 9 is a schematic diagram illustrating the instant messaging system that implements data classification and processing according to an eighth embodiment of the present invention. The instant messaging system that implements data classification and processing includes: a data classifying unit 91, a non-confidential data obtaining unit 92, a second authentication unit 93, a confidential data obtaining unit 94 and a data generation time obtaining unit 95.

Specifically, the data generation time obtaining unit 95 is adapted to obtain the time that each data of the personal webpage service is generated, and to send the obtained time that the data is generated to the data classifying unit 91.

The data classifying unit 91 is adapted to compare the obtained time that the data is generated with a reference time, to classify the data as confidential data if the time that it is generated is earlier than the reference time, and to classify the data as non-confidential data if the time that it is generated is later than the reference time, with the confidential data and the non-confidential data being configured with a confidential-or-not identifier respectively.

The functions of the other units of the eighth embodiment of the present invention are identical to those of the corresponding units of the fifth embodiment of the present invention, thus are not described repeatedly herein.

The foregoing is merely preferred embodiments of the present invention and is not intended to limit the scope of the present invention. Any modifications or alterations devised by those skilled in the art without exerting an inventive effort shall fall into the scope of the present invention. Therefore, the scope of the present invention shall be defined by the appended claims.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for classifying and processing data in an instant messaging system, comprising:
    classifying the data of every service included in the instant messaging system into confidential and non-confidential portions of the data based on at least one of (i) a number of times that the data of a service included in the instant messaging system has been accessed, (ii) time that the data of a service included in the instant messaging system is generated, or (iii) whether the data of a service included in the instant messaging system has been accessed, wherein the every service is a non-instant-messaging service;
    responsive to a user requesting access to the data, obtaining and processing the non-confidential portion of the data of every service after a first authentication of the user of the instant messaging system is passed successfully, wherein the obtaining and processing the non-confidential portion of the data of every service after the first authentication of the user is passed successfully comprises inputting an instant messaging password used by the user to initiate instant messaging prior to classifying the data; and
    responsive to the user request to access to the data, obtaining and processing the confidential portion of the data of every service after a second authentication of the user is passed successfully after the process of obtaining and processing the non-confidential portion of the data of every service after the first authentication is passed successfully, wherein the obtaining and processing the confidential portion of the data of every service after the second authentication of the user is passed successfully comprises inputting a separate password corresponding to one service included in the instant messaging system, wherein the separate password is different from the instant messaging password.

2. The method according to claim 1, wherein the process of classifying the data of every service included in the instant messaging system into the confidential and non-confidential portions of the data comprises:
- calculating the number of times that each data of the service included in the instant messaging system has been accessed; and
- classifying the data as the confidential portion of the data if the number of times that it has been accessed exceeds a predetermined value, and classifying the data as the non-confidential portion of the data otherwise.

3. The method according to claim 2, further comprising:
- resetting a confidential-data-or-not flag of the non-confidential portion of the data, and setting the confidential-data-or-not flag of the confidential portion of the data, wherein the confidential-data-or-not flag is used for indicating whether the data is the confidential or non-confidential portion of the data.

4. The method according to claim 3, wherein the process of obtaining and processing the non-confidential portion of the data of every service comprises:
- determining, according to the confidential-data-or-not flag of each data of the service, whether the data of the service is the non-confidential portion of the data; and
- obtaining and processing the data if the data is the non-confidential portion of the data.

5. The method according to claim 3, wherein the process of obtaining and processing the confidential portion of the data of every service comprises:
- determining, according to the confidential-data-or-not flag of each data of the service, whether the data of the service is the confidential portion of the data; and
- obtaining and processing the data if the data is the confidential portion of the data.

6. The method according to claim 1, wherein the process of classifying the data of every service included in the instant messaging system into the confidential and non-confidential portions of the data comprises:
- obtaining time that each data of the service included in the instant messaging system is generated; and
- classifying the data as the non-confidential portion of the data if the time that it is generated is later than a predetermined time, and classifying the data as the confidential portion of the data otherwise.

7. The method according to claim 6, further comprising:
- resetting a confidential-data-or-not flag of the non-confidential portion of the data, and setting the confidential-data-or-not flag of the confidential portion of the data, wherein the confidential-data-or-not flag is used for indicating whether the data is the confidential or non-confidential portion of the data.

8. The method according to claim 7, wherein the process of obtaining and processing the non-confidential portion of the data of every service comprises:
- determining, according to the confidential-data-or-not flag of each data of the service, whether the data of the service is the non-confidential portion of the data; and
- obtaining and processing the data if the data is the non-confidential portion of the data.

9. The method according to claim 7, wherein the process of obtaining and processing the confidential portion of the data of every service comprises:
- determining, according to the confidential-data-or-not flag of each data of the service, whether the data of the service is the confidential portion of the data; and
- obtaining and processing the data if the data is the confidential portion of the data.

10. The method according to claim 1, wherein the process of classifying the data of every service included in the instant messaging system into confidential and non-confidential portions of the data comprises:
- determining whether the data of the service included in the instant messaging system has been accessed; and
- classifying the data as the non-confidential portion of the data if the data has not been accessed, and classifying the data as the confidential portion of the data otherwise.

11. The method according to claim 10, further comprising:
- resetting a confidential-data-or-not flag of the non-confidential portion of the data, and setting the confidential-data-or-not flag of the confidential portion of the data, wherein the confidential-data-or-not flag is used for indicating whether the data is the confidential or non-confidential portion of the data.

12. The method according to claim 11, wherein the process of obtaining and processing the non-confidential portion of the data of every service comprises:
- determining, according to the confidential-data-or-not flag of each data of the service, whether the data of the service is the non-confidential portion of the data; and
- obtaining and processing the data if the data is the non-confidential portion of the data.

13. The method according to claim 11, wherein the process of obtaining and processing the confidential portion of the data of every service comprises:
- determining, according to the confidential-data-or-not flag of each data of the service, whether the data of the service is the confidential portion of the data; and
- obtaining and processing the data if the data is the confidential portion of the data.

14. A device for classifying and processing data in an instant messaging system, comprising:
- a data classifying unit, adapted to classify the data of every service included in the instant messaging system into confidential and non-confidential portions of the data based on at least one of (i) a number of times that the data of a service included in the instant messaging system has been accessed, (ii) time that the data of a service included in the instant messaging system is generated, or (iii) whether the data of a service included in the instant messaging system has been accessed, wherein the every service is a non-instant-messaging service;
- a non-confidential data obtaining unit, adapted to obtain, when the service is activated, responsive to a user requesting access to the data, the non-confidential portion of the data of the service after a first authentication of the user of the instant messaging system is passed successfully, wherein the obtaining the non-confidential portion of the data of the service after the first authentication of the user is passed successfully comprises inputting an instant messaging password used by the user to initiate instant messaging prior to classifying the data;

a second authentication unit, adapted to implement, responsive to the user requesting access to the data, a second authentication of the user, and to send confirmation information used for indicating that the second authentication is passed successfully after the second authentication is passed successfully; and a confidential data obtaining unit, adapted to obtain the confidential portion of the data of the service after receiving the confirmation information used for indicating that the second authentication is passed successfully sent from the second authentication unit, wherein the implementing and obtaining the confidential portion of the data of service after the second authentication of the user is passed successfully comprises inputting a separate password corresponding to the service included in the instant messaging system, wherein the separate password is different from the instant messaging password, wherein the data classifying unit, the non-confidential data obtaining unit, the second authentication unit, and the confidential data obtaining unit are implemented by a processor and memory.

15. The device according to claim 14, further comprising:
a times-having-been-accessed calculating unit, adapted to calculate the number of times that each data of the service included in the instant messaging system has been accessed, and send a result of the calculation to the data classifying unit, wherein the data classifying unit is adapted to classify the data as the confidential portion of the data if the number of times that it has been accessed exceeds a predetermined value, and to classify the data as the non-confidential portion of the data otherwise.

16. The device according to claim 15, wherein the data classifying unit is further adapted to reset a confidential-data-or-not flag of the non-confidential portion of the data, and to set the confidential-data-or-not flag of the confidential portion of the data, wherein the confidential-data-or-not flag is used for indicating whether the data is the confidential or non-confidential portion of the data;

the non-confidential data obtaining unit is adapted to determine the non-confidential portion of the data of the service according to the confidential-data-or-not flag; and the confidential data obtaining unit is adapted to determine the confidential portion of the data of the service according to the confidential-data-or-not flag.

17. The device according to claim 14, further comprising:
a determining unit, adapted to determine whether the data of the service included in the instant messaging system has been accessed, and send a result of the determination to the data classifying unit, wherein the data classifying unit is adapted to classify the data as the confidential portion of the data if the data has been accessed, and to classify the data as the non-confidential portion of the data if the data has not been accessed.

18. The device according to claim 17, wherein the data classifying unit is further adapted to reset a confidential-data-or-not flag of the non-confidential portion of the data, and to set the confidential-data-or-not flag of the confidential portion of the data, wherein the confidential-data-or-not flag is used for indicating whether the data is the confidential or non-confidential portion of the data;

the non-confidential data obtaining unit is adapted to determine the non-confidential portion of the data of the service according to the confidential-data-or-not flag; and the confidential data obtaining unit is adapted to determine the confidential portion of the data of the service according to the confidential-data-or-not flag.

19. The device according to claim 14, further comprising:
a data generation time obtaining unit, adapted to obtain time that each data of the service included in the instant messaging system is generated, and to send the obtained time that the data is generated to the data classifying unit, wherein the data classifying unit is adapted to classify the data as the non-confidential portion of the data if the time that it is generated is later than a predetermined time, and to classify the data as the confidential portion of the data otherwise.

20. The device according to claim 19, wherein the data classifying unit is further adapted to reset a confidential-data-or-not flag of the non-confidential portion of the data, and to set the confidential-data-or-not flag of the confidential portion of the data, wherein the confidential-data-or-not flag is used for indicating whether the data is the confidential or non-confidential portion of the data;

the non-confidential data obtaining unit is adapted to determine the non-confidential portion of the data of the service according to the confidential-data-or-not flag; and the confidential data obtaining unit is adapted to determine the confidential portion of the data of the service according to the confidential-data-or-not flag.

* * * * *